US012665460B2

(12) United States Patent
Egami

(10) Patent No.: US 12,665,460 B2
(45) Date of Patent: Jun. 23, 2026

(54) ROTATING ELECTRICAL MACHINE WIRING COMPONENT AND ROTATING ELECTRICAL MACHINE WIRING COMPONENT MANUFACTURING METHOD

(71) Applicant: Proterial, Ltd., Tokyo (JP)

(72) Inventor: Kenichi Egami, Tokyo (JP)

(73) Assignee: Proterial, Ltd., Tokyo (JP)

( * ) Notice: Subject to any disclaimer, the term of this patent is extended or adjusted under 35 U.S.C. 154(b) by 206 days.

(21) Appl. No.: 18/767,503

(22) Filed: Jul. 9, 2024

(65) Prior Publication Data

US 2025/0030295 A1     Jan. 23, 2025

(30) Foreign Application Priority Data

Jul. 21, 2023    (JP) ................................. 2023-119380

(51) Int. Cl.
    H02K 3/38      (2006.01)
    H02K 3/04      (2006.01)
    H02K 15/32     (2025.01)

(52) U.S. Cl.
    CPC ................. H02K 3/38 (2013.01); H02K 3/04 (2013.01); H02K 15/32 (2025.01); *H02K 2203/06* (2013.01)

(58) Field of Classification Search
    CPC ............. H02K 3/38; H02K 3/04; H02K 15/32
    See application file for complete search history.

(56) References Cited

U.S. PATENT DOCUMENTS

| | | | |
|---|---|---|---|
| 9,419,491 B2 | 8/2016 | Egami et al. | |
| 10,978,928 B2 | 4/2021 | Mashiko et al. | |
| 11,563,350 B2 * | 1/2023 | Takahashi .............. | H02K 21/14 |
| 11,605,996 B2 | 3/2023 | Mashiko et al. | |
| 2011/0175472 A1 * | 7/2011 | Koike ...................... | H02K 3/50 310/71 |
| 2014/0306561 A1 | 10/2014 | Egami et al. | |
| 2014/0306562 A1 * | 10/2014 | Egami ................... | H02K 5/225 310/71 |
| 2021/0013761 A1 | 1/2021 | Mashiko et al. | |
| 2021/0184533 A1 | 6/2021 | Mashiko et al. | |

FOREIGN PATENT DOCUMENTS

| | | |
|---|---|---|
| JP | 2014-207827 A | 10/2014 |
| JP | 2021-013263 A | 2/2021 |

* cited by examiner

*Primary Examiner* — Sean Gugger
(74) *Attorney, Agent, or Firm* — Studebaker Brackett PLLC

(57)        ABSTRACT

A rotating electrical machine wiring component is configured to be connected to an armature winding of a rotating electrical machine and includes a conductor wire comprising a conductive metal, and an insulation covering a portion of the conductor wire, wherein the conductor wire comprises a flat plate-shaped connecting portion located at one end and connected to the armature winding, and a bent portion bent by a bending process in a vicinity of the connecting portion, wherein the conductor wire is not covered with the insulation at the connecting portion and the bent portion, and wherein a cross-sectional shape of the conductor wire in a cross-section perpendicular to an extending direction of the conductor wire is rectangular at the connecting portion and circular at the bent portion.

5 Claims, 9 Drawing Sheets

ROTATING ELECTRICAL MACHINE WIRING COMPONENT AND ROTATING ELECTRICAL MACHINE WIRING COMPONENT MANUFACTURING METHOD

CROSS-REFERENCE TO RELATED APPLICATIONS

The present application is based on Japanese patent application No. 2023-119380filed on Jul. 21, 2023, the entire contents of which are incorporated herein by reference.

TECHNICAL FIELD

This disclosure relates to a rotating electrical machine wiring component and a rotating electrical machine wiring component manufacturing method.

BACKGROUND OF THE INVENTION

The present applicant has proposed conventional wiring components described in Patent Literatures 1 and 2, which connect a winding of a rotating electrical machine, such as a motor, to a terminal block. These wiring components are formed by performing a predetermined process on an insulated wire in which a conductor wire made of a conductive metal and having a circular cross-section is covered with insulation such as enamel, and the conductor wire is exposed by removing the insulation at one end connected to the winding and at the other end connected to the terminal block. The conductor wire is crushed and processed into a plate shape at the one end connected to the winding. The one end of the wiring component processed into a plate shape is connected to the winding by welding such as TIG (Tungsten Inert Gas) welding.

In addition, the wiring components described in Patent Literatures 1 and 2 are bent at plural locations so as to be able to connect the winding to the terminal block while avoiding contact with surrounding members. In the wiring component described in Patent Literature 1, the portion covered with the insulation is bent at plural locations. In the wiring component described in Patent Literature 2, the portion covered with the insulation is bent at plural locations, and the portion formed in a plate shape with the insulation removed is also bent in its plate thickness direction.

Citation List

Patent Literature 1: JP2014-207827A
Patent Literature 2: JP2021-13263A

SUMMARY OF THE INVENTION

When the conductor wire is bent at a portion covered with an insulation as in the wiring component described in Patent Literature 1, the insulation is stretched on the outer side of the bent portion. When welding of the windings, etc. is performed in this state, the insulation may become partially thin due to heat of the welding if the distance between the portion to be welded and the bent portion is short. For this reason, the distance between the portion to be welded and the bent portion needs to be long, which may result in an increase in size of the wiring component depending on the relationship between the position connected to the winding and the position of the terminal block.

Meanwhile, in the case where the portion formed in a plate shape with the insulation removed is bent as in the wiring component described in Patent Literature 2, a portion to be connected to the winding may become distorted depending on the bending direction, causing problems in connection with the winding. This causes a restriction on the bending direction, and the overall length of the wiring component may become longer due to the restriction on the bending direction, resulting in an increase in size of the wiring component.

The invention was made in view of such circumstances and it is an object of the invention to provide a rotating electrical machine wiring component that allows a conductor wire to be bent even in the vicinity of a flat plate-shaped connecting portion to be connected to a winding and can suppress an increase in size, and a method for manufacturing the same.

To solve the problem described above, one aspect of the invention provides a rotating electrical machine wiring component configured to be connected to an armature winding of a rotating electrical machine, the rotating electrical machine wiring component comprising:

a conductor wire comprising a conductive metal; and
an insulation covering a portion of the conductor wire,
wherein the conductor wire comprises a flat plate-shaped connecting portion located at one end and connected to the armature winding, and also comprises a bent portion bent by a bending process in a vicinity of the connecting portion,
wherein the conductor wire is not covered with the insulation at the connecting portion and the bent portion, and
wherein a cross-sectional shape of the conductor wire in a cross-section perpendicular to an extending direction of the conductor wire is rectangular at the connecting portion and circular at the bent portion.

To solve the problem described above, another aspect of the invention provides a method for manufacturing a rotating electrical machine wiring component configured to be connected to an armature winding of a rotating electrical machine, the method comprising:

using, as a material, an insulated wire obtained by covering a conductor wire comprising a conductive metal with an insulation;
removing a predetermined length of the insulation at an end of the material; forming a bent portion by bending the conductor wire of a portion where the insulation has been removed; and
forming a connecting portion to be connected to the armature winding, by processing a portion of the conductor wire on a tip side relative to the bent portion into a flat plate shape.

Advantageous Effects of the Invention

According to a rotating electrical machine wiring component and a method for manufacturing the same of the invention, it is possible to suppress an increase in size of the rotating electrical machine wiring component.

BRIEF DESCRIPTION OF DRAWINGS

FIGS. 7A to 7E are cross-sectional views taken along lines A-A, B-B, C-C, D-D, and E-E in FIG. 6, which are perpendicular to an extending direction of a conductor wire.

FIGS. 9A to 9D are explanatory diagrams illustrating a method for manufacturing the first busbar.

DETAILED DESCRIPTION OF THE INVENTION

Embodiment

Figure 1:
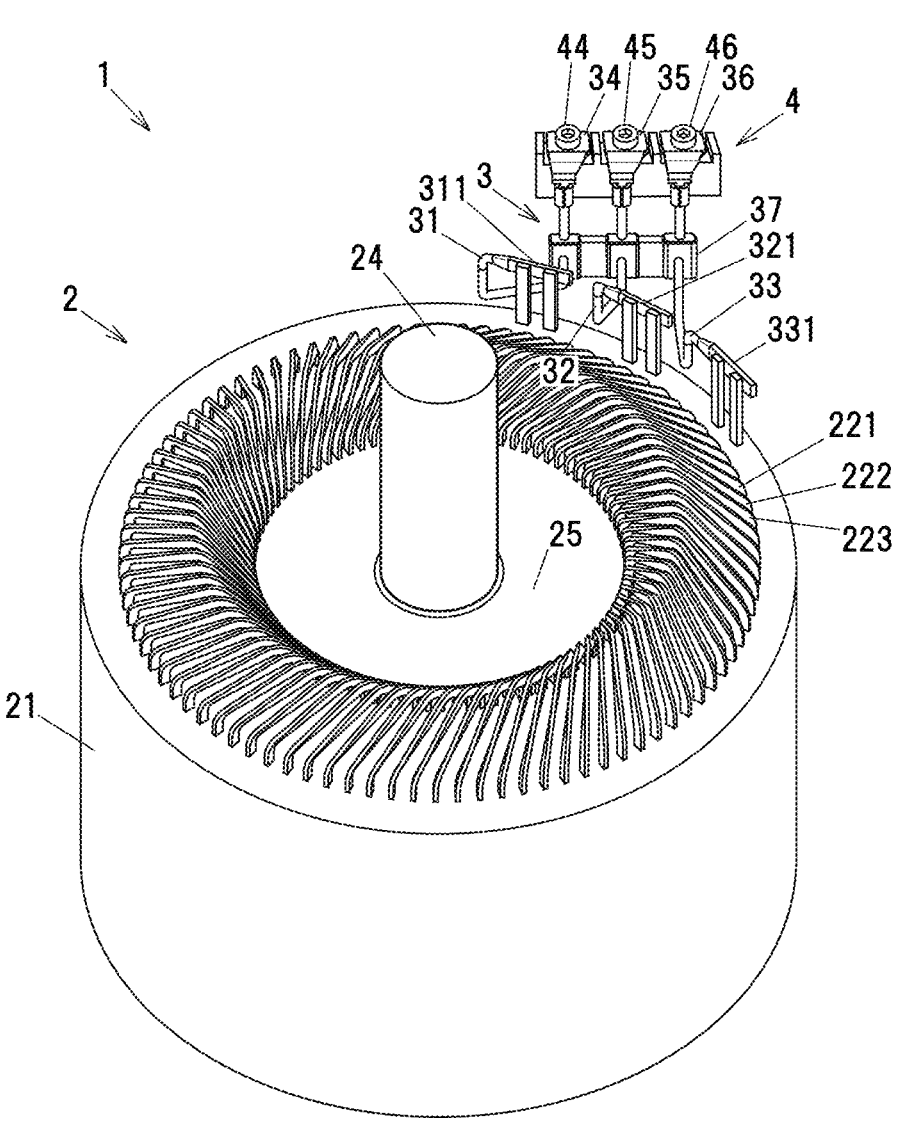
FIG. 1 is a perspective view showing a rotating electrical machine assembly in one embodiment.
Figure 2A:
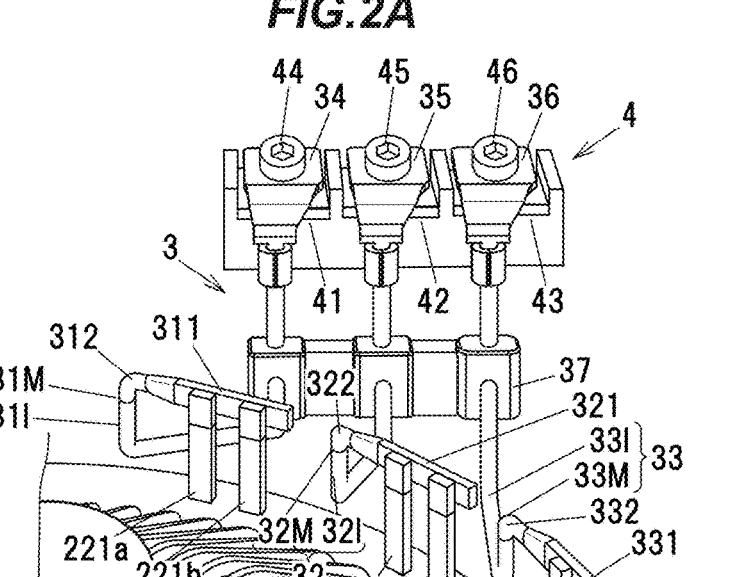
FIG. 2A is a perspective view showing a portion of the rotating electrical machine assembly before a welding step is performed.
Figure 2B:
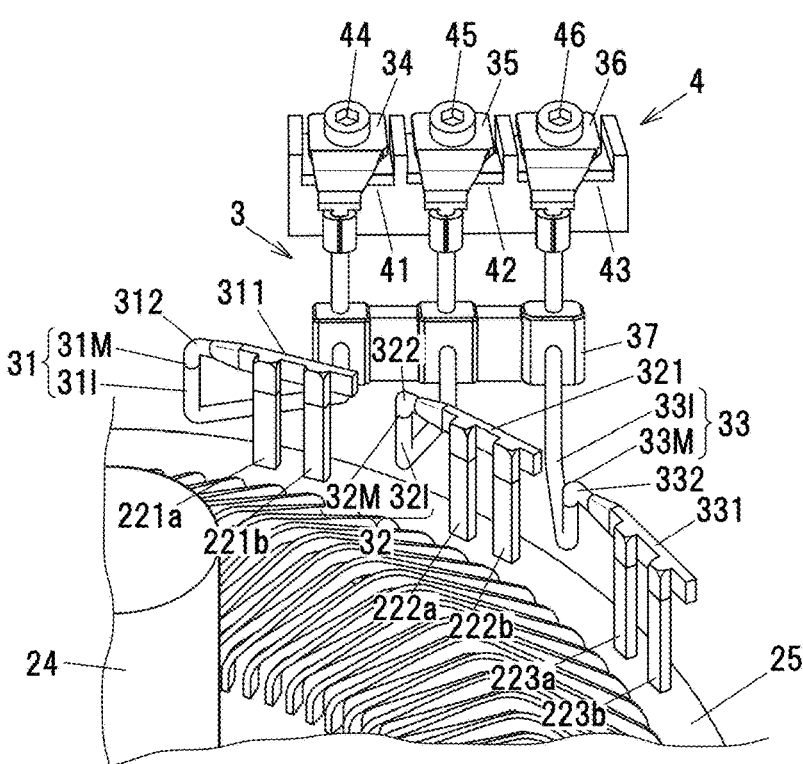
FIG. 2B is a perspective view showing the portion of the rotating electrical machine assembly after the welding step is performed.
Figure 3:
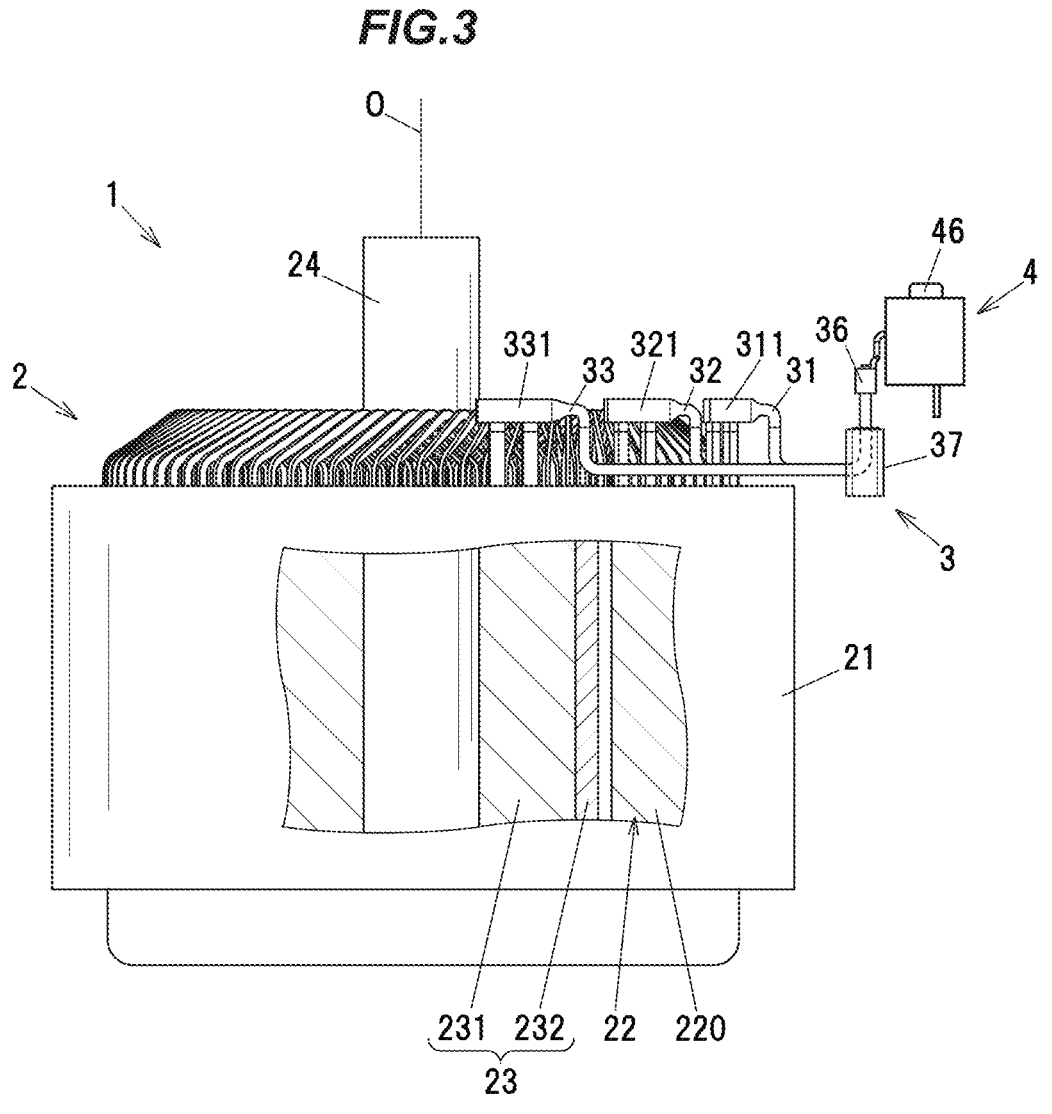
FIG. 3 is a configuration diagram illustrating the rotating electrical machine assembly and a terminal block as viewed from a side.

FIG. 1 is a perspective view showing a rotating electrical machine assembly 1 having a rotating electrical machine wiring component in an embodiment of the invention together with a terminal block 4. FIG. 2A is a perspective view showing a portion of the rotating electrical machine assembly 1 before a welding step is performed. FIG. 2B is a perspective view showing the portion of the rotating electrical machine assembly 1 after the welding step is performed. FIG. 3 is a configuration diagram illustrating the rotating electrical machine assembly 1 and the terminal block 4 as viewed from a side.

The rotating electrical machine assembly 1 has a rotating electrical machine 2, and a busbar unit 3 that has first to third busbars 31 to 33 as plural wiring components for rotating electrical machine. In FIG. 3, the rotating electrical machine 2 is partially broken away to illustrate its internal structure.

The rotating electrical machine 2 is mounted on a vehicle as a drive source for travel and also as a generator for generating electricity during regenerative braking and is connected to an inverter (not shown) through the busbar unit 3 and the terminal block 4. The rotating electrical machine 2 is a three-phase motor and its armature windings 221 to 223 (described later) are electrically connected to first to third washers 41 to 43 of the terminal block 4 by the busbar unit 3.

The rotating electrical machine 2 has a case 21 having a bottomed cylindrical shape, an armature 22 which is a stator fixed on the inner side of the case 21, a rotor 23 arranged on the inner side of the armature 22, a shaft 24 that passes through the center of the rotor 23 and is supported so as to be able to rotate integrally with the rotor 23, and a disk-shaped lid member 25 made of a molding resin and covering an opening of the case 21.

In the armature 22, the U-, V- and W-phase armature windings 221 to 223 are wound on an armature core 220 that is an annular iron core surrounding the rotor 23. In more particular, one of the U-, V- and W-phase windings 221 to 223 is wound around each of plural teeth provided on the armature core 220. The armature core 220 is made of a magnetic material such as steel. The armature windings 221 to 223 are rectangular insulated wires having a rectangular cross-section. The armature windings 221 to 223 are molded in the lid member 25 so as to be partially exposed from the lid member 25 to the outside of the case 21.

The rotor 23 has a cylindrical rotor core 231 having a through-hole for insertion of the shaft 24, and plural magnets 232 arranged on the outer peripheral portion of the rotor core 231. The magnets 232 have magnetic poles provided in such a manner that S-poles and N-poles are located alternately along a circumferential direction of the rotor core 231. The shaft 24 is rotatably supported on the case 21 by a bearing (not shown) and rotates about a rotation axis O.

Figure 4:
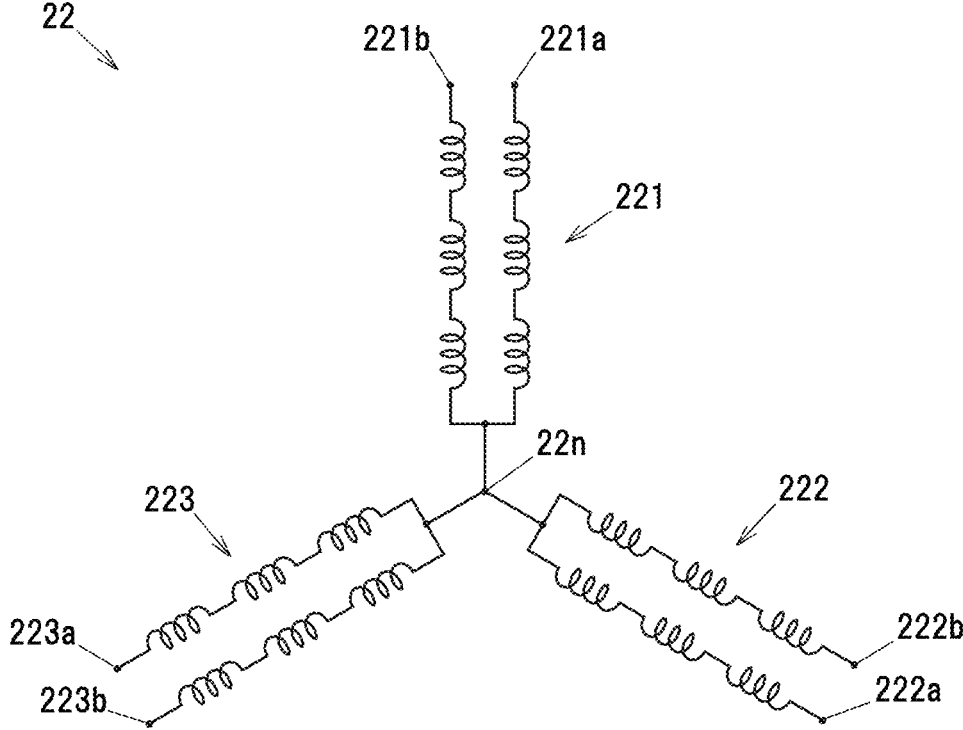
FIG. 4 is a circuit diagram illustrating an example of a configuration of an electric circuit formed by armature windings in a rotating electrical machine.

FIG. 4 is a circuit diagram illustrating an example of a configuration of an electric circuit formed by the armature windings 221 to 223 in the rotating electrical machine 2. Each of the U-phase armature winding 221, the V-phase armature winding 222 and the W-phase armature winding 223 is wound on the armature core 220 so that coils are formed at plural locations (six locations in the example shown in FIG. 4) and its center portion is connected to a neutral point 22$n$. A U-phase current is supplied to one and other ends 221$a$ and 221$b$ of the U-phase armature winding 221. A V-phase current is supplied to one and other ends 222$a$ and 222$b$ of the V-phase armature winding 222. A W-phase current is supplied to one and other ends 223$a$ and 223$b$ of the W-phase armature winding 323.

The one end 221$a$ and the other end 221$b$ of the U-phase armature winding 221 are aligned parallel to each other with a predetermined distance and protrude to the outside from the lid member 25. So are the one end 222$a$ and the other end 222$b$ of the V-phase armature winding 222, and the one end 223$a$ and the other end 223$b$ of the W-phase armature winding 223. The one end 221$a$ and the other end 221$b$ of the U-phase armature winding 221, the one end 222$a$ and the other end 222$b$ of the V-phase armature winding 222, and the one end 223$a$ and the other end 223$b$ of the W-phase armature winding 223 protrude from the circumferential edge portion of the lid member 25 so as to be parallel to the rotation axis O and are aligned in a predetermined alignment direction along a circumferential direction of the case 21.

The busbar unit 3 has the first to third busbars 31 to 33, first to third connection terminals 34 to 36 respectively attached to the first to third busbars 31 to 33, and a busbar holder 37 that is made of a resin and holds the first to third busbars 31 to 33. The busbar holder 37 is formed of a molded article. Each of the first to third busbars 31 to 33 is the wire-shaped rotating electrical machine wiring component.

Each of the first to third busbars 31 to 33 has a conductor wire 31M, 32M, 33M, which is made of a highly conductive metal such as a copper alloy, and an insulation 31I, 32I, 33I, which is made of an insulating material such as enamel. At both longitudinal ends of the first to third busbars 31 to 33, the insulations 31I, 32I and 33I are stripped and the conductor wires 31M, 32M, and 33M are exposed. The conductor wires 31M, 32M and 33M in the portions covered with the insulations 31I, 321 and 33I have a circular cross-section. The first to third busbars 31 to 33 are bent at plural locations in the portions where the conductor wires 31M, 32M and 33M are covered with the insulations 31I, 32I and 33I.

The first busbar 31 has, at one end, a flat plate-shaped connecting portion 311 to which both the one end 221a and the other end 221b of the U-phase armature winding 221 of the rotating electrical machine 2 are connected by welding, and also has, in the vicinity of the connecting portion 311, a bent portion 312 bent by a bending process. The connecting portion 311 extends in an extending direction along the alignment direction of the one end 221a and the other end 221b of the U-phase armature winding 221, and the one end 221a and the other end 221b of the U-phase armature winding 221 are welded to the connecting portion 311 at different locations in the extending direction. This welding can be performed by, e.g., TIG welding or laser welding. The first connection terminal 34 is welded or crimped to the other end of the first busbar 31.

The second busbar 32 has, at one end, a flat plate-shaped connecting portion 321 to which both the one end 222a and the other end 222b of the V-phase armature winding 222 of the rotating electrical machine 2 are connected by welding, and also has, in the vicinity of the connecting portion 321, a bent portion 322 bent by a bending process. The connecting portion 321 extends in the extending direction along the alignment direction of the one end 222a and the other end 222b of the V-phase armature winding 222, and the one end 222a and the other end 222b of the V-phase armature winding 222 are welded to the connecting portion 321 at different locations in the extending direction. The second connection terminal 35 is welded or crimped to the other end of the second busbar 32.

The third busbar 33 has, at one end, a flat plate-shaped connecting portion 331 to which both the one end 223a and the other end 223b of the W-phase armature winding 223 of the rotating electrical machine 2 are connected by welding, and also has, in the vicinity of the connecting portion 331, a bent portion 332 bent by a bending process. The connecting portion 331 extends in the extending direction along the alignment direction of the one end 223a and the other end 223b of the W-phase armature winding 223, and the one end 223a and the other end 223b of the W-phase armature winding 223 are welded to the connecting portion 331 at different locations in the extending direction. The third connection terminal 36 is welded or crimped to the other end of the third busbar 33.

The first connection terminal 34 is connected to the first washer 41 of the terminal block 4, the second connection terminal 35 to the second washer 42 of the terminal block 4, and the third connection terminal 36 to the third washer 43 of the terminal block 4, respectively by bolts 44, 45, and 46. The first to third washers 41, 42, and 43 are connected to the inverter by wiring (not shown).

Figure 5:
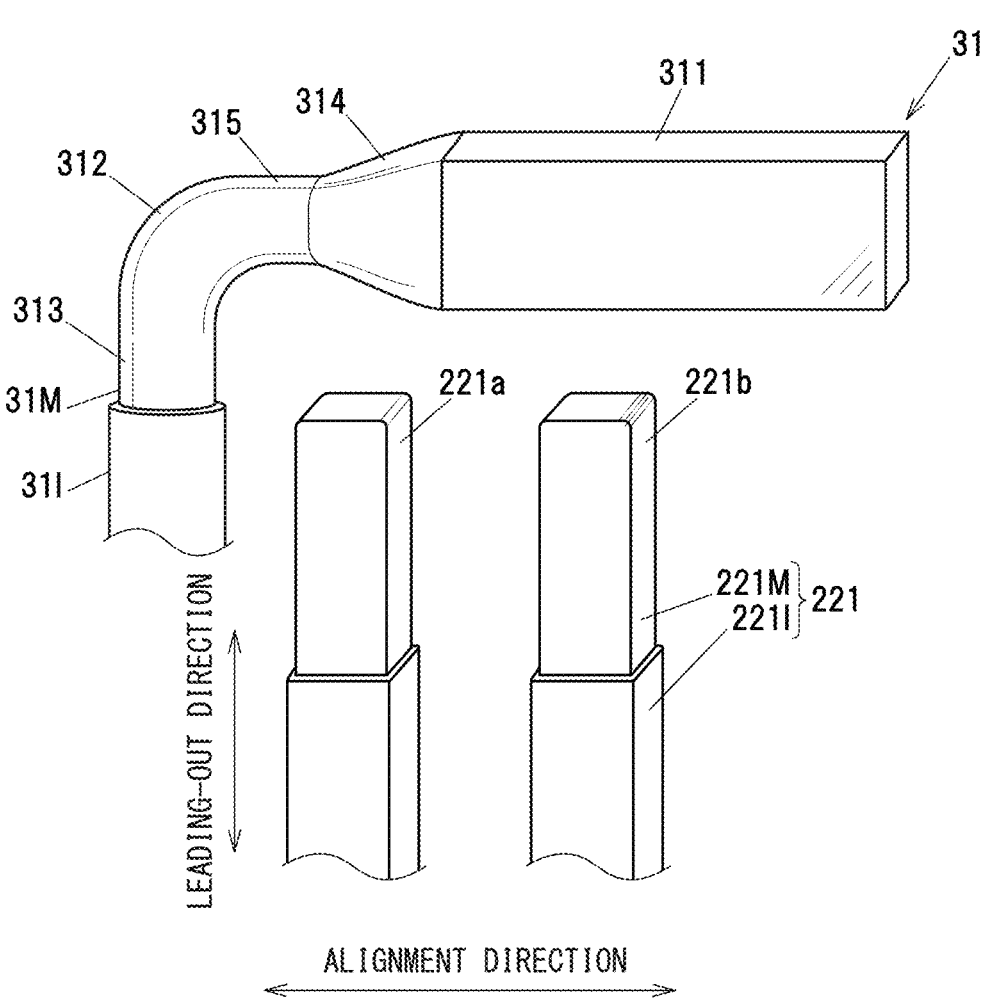
FIG. 5 is a perspective view showing one longitudinal end of a first busbar, and one and other ends of a U-phase armature winding to be connected to a connecting portion of the first busbar.

FIG. 5 is a perspective view showing one longitudinal end of the first busbar 31, and the one end 221a and the other end 221b of the U-phase armature winding 221 to be connected to the connecting portion 311 of the first busbar 31. In FIG. 5, the leading-out direction and the alignment direction of the one end 221a and the other end 221b of the U-phase armature winding 221 are indicated by double-headed arrows. In the present embodiment, the leading-out direction of the one end 221a and the other end 221b of the armature winding 221 is parallel to the rotation axis O of the shaft 24. The alignment direction of the one end 221a and the other end 221b of the armature winding 221 coincides with a circumferential direction about the rotation axis O. The armature winding 221 has a conductor 221M made of a copper alloy and an insulation coating layer 221I made of enamel and formed on an outer surface of the conductor 221M, and at the portion to be connected to the connecting portion 311 of the first busbar 31, the insulation coating layer 221I is removed and the conductor 221M is exposed.

Figure 6:
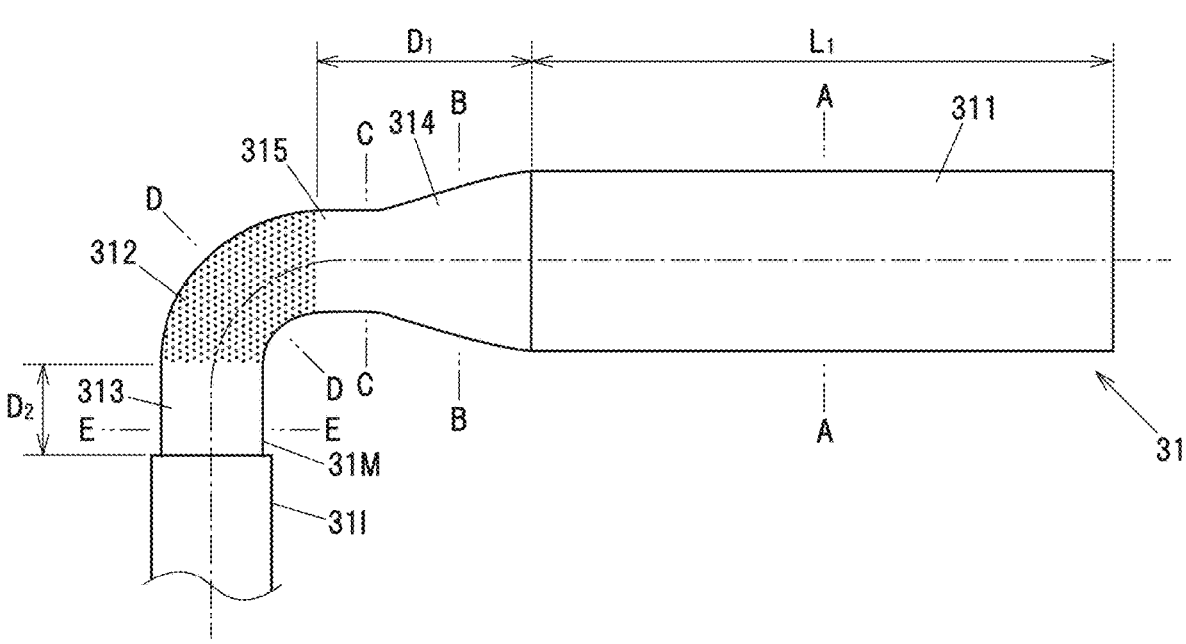
FIG. 6 is a configuration diagram illustrating the first busbar in the area around the connecting portion and a bent portion as viewed from a direction perpendicular to the connecting portion.

FIG. 6 is a configuration diagram illustrating the first busbar 31 in the area around the connecting portion 311 and the bent portion 312 as viewed from a direction perpendicular to the connecting portion 311. In FIG. 6, the bent portion 312 of the first busbar 31 is shown in gray, and a central axis C of the conductor wire 31M is indicated by a dash-dot line. In the following description, the extending direction of the conductor wire 31M is a direction along the central axis C.

At the connecting portion 311 and the bent portion 312 of the first busbar 31, the conductor wire 31M is not covered with the insulation 31I. The shape of the connecting portion 311 as viewed from the side where the one end 221a and the other end 221b of the armature winding 221 to be connected thereto are located is a rectangular shape that is long in the alignment direction of the one end 221a and the other end 221b. The connecting portion 311 is arranged so as to face side surfaces of the ends 221a, 221b of the armature winding 221 along a direction perpendicular to the leading-out direction and alignment direction of the ends 221a, 221b of the armature winding 221.

The first busbar 31 has a straight portion 313 that is continuous with the bent portion 312 and extends in the leading-out direction of the one end 221a and the other end 221b of the armature winding 221. At the straight portion 313, the conductor wire 31M is not covered with the insulation 31I in a portion on the bent portion 312 side, and is covered with the insulation 31I in the remaining portion. In other words, the insulation 31I covers the outer circumferential surface of the conductor wire 31M at a position farther from the connecting portion 311 than from the bent portion 312 in the extending direction of the conductor wire 31M.

The first busbar 31 also has, between the connecting portion 311 and the bent portion 312, a gradually changing portion 314 whose cross-sectional shape in a cross-section perpendicular to the central axis C gradually changes, and an extension portion 315 extending parallel to the longitudinal direction of the connecting portion 311. The gradually changing portion 314 is formed continuously with the connecting portion 311. The extension portion 315 is formed continuously with the bent portion 312 and the gradually changing portion 314. In this regard, the first busbar 31 may not have the extension portion 315, and the gradually changing portion 314 may be formed continuously with the connecting portion 311 and the bent portion 312.

$D_1$ is shorter than $L_1$, where $D_1$ is a distance between the connecting portion 311 and the bent portion 312 in the extending direction of the conductor wire 31M, and $L_1$ is a length of the connecting portion 311 in the longitudinal direction. As a result, the length of the first busbar 31 is reduced and the size of the first busbar 31 is thereby reduced, and it is also easier to avoid contact between the first to third busbars 31 to 33 when the ends 221a, 221b, 222a, 222b, 223a, 223b of the respective phase armature windings 221, 222, 223 are arranged in the circumferential direction of the case 21 as shown in FIGS. 1 and 2.

The conductor wire 31M is bent at the bent portion 312 at a right angle to turn in the lateral direction of the connecting portion 311 relative to the connecting portion 311. That is, the central axis C of the conductor wire 31M is parallel to the alignment direction of the one end 221a and the other end 221b of the armature winding 221 at the portions of the first busbar 31 on the tip side relative to the bent portion 312 (at the connecting portion 311, the gradually changing portion 314 and the extension portion 315), and the central axis C of the conductor wire 31M is parallel to the leading-out direction of the one end 221*a* and the other end 221*b* of the armature winding 221 at the straight portion 313. However, the bending angle at the bent portion 312 is not limited to the right angle (90°) and may be an obtuse angle or an acute angle.

Figure 7A:
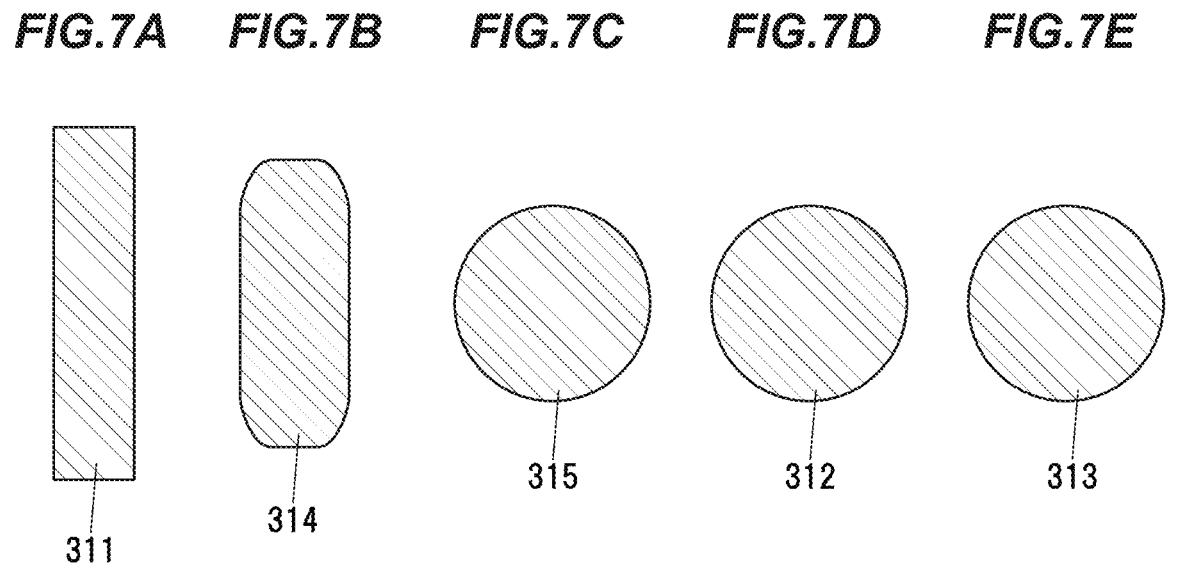

FIGS. 7A to 7E are cross-sectional views taken along lines A-A, B-B, C-C, D-D, and E-E in FIG. 6, which are perpendicular to the extending direction of the conductor wire 31M. FIG. 7A shows a cross-section of the connecting portion 311, FIG. 7B shows a cross-section of the gradually changing portion 314, FIG. 7C shows a cross-section of the extension portion 315, FIG. 7D shows a cross-section of the bent portion 312, and FIG. 7E shows a cross-section of the straight portion 313.

The cross-sectional shape of the conductor wire 31M in a cross-section perpendicular to the extending direction of the conductor wire 31M is a rectangular shape which is long in the leading-out direction of the one end 221*a* and the other end 221*b* of the armature winding 221 at the connecting portion 311, and a circular shape at the extension portion 315, the bent portion 312 and the straight portion 313. The cross-sectional shape of the gradually changing portion 314 gradually changes from a rectangular shape to a circular shape toward the bent portion 312 from the connecting portion 311. The cross-sectional shape of the bent portion 312 is not limited to a perfect circle, and may be a slightly distorted circle due to plastic deformation at the time of bending.

Figure 8:
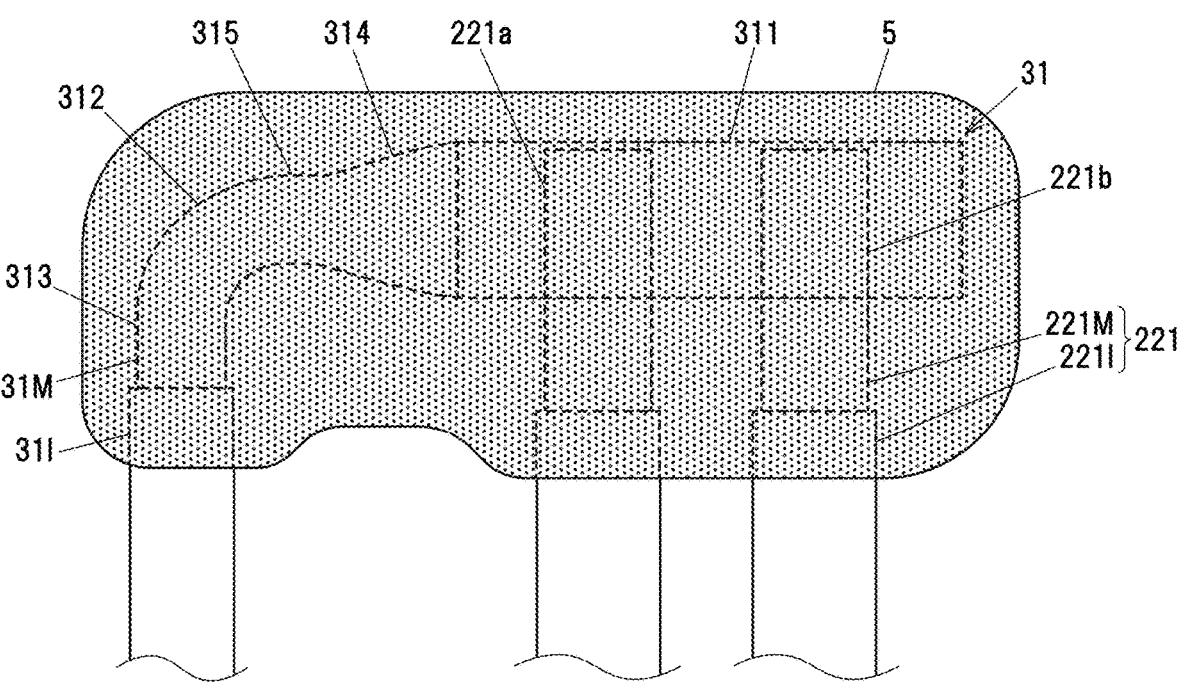
FIG. 8 is an external view showing one end of the first busbar when a portion at which the conductor wire is not covered with an insulation is covered with an electrically insulating covering material.

FIG. 8 is an external view showing one end of the first busbar 31 when portions at which the conductor wire 31M is not covered with the insulation 31I, i.e., the connecting portion 311, the gradually changing portion 314, the extension portion 315, the bent portion 312 and a portion of the straight portion 313, together with the one end 221*a* and the other end 221*b* of the armature winding 221, are covered with an electrically insulating covering material 5. In FIG. 8, the covering material 5 is shown in gray, and the first busbar 31 and the one end 221*a* and the other end 221*b* of the armature winding 221 in the area covered with the covering material 5 are indicated by dash-dot lines. The covering material 5 is formed in a range where the insulation 31I of the first busbar 31 and the insulation coating layer 2211 of the armature winding 221 are partially covered.

The process of forming the covering material 5 can be performed by, e.g., powder coating. In this case, the lid member 25 from which the one end 221*a* and the other end 221*b* of the armature winding 221 protrude is positioned to face vertically downward and is dipped into a powder fluidized bed with flowing insulating powder in a state in which the connecting portion 311, etc. is heated, so that the insulating powder is fused and bonded. However, it is not limited to the powder coating, and the covering material 5 may be formed by, e.g., electrophoretic coating. The covering material 5 is formed not only on the first busbar 31 but also on the second busbar 32 and the third busbar 33 in the same manner.

As shown in FIG. 6, $D_2$ is shorter than $D_1$, where $D_2$ is a distance in the extending direction of the conductor wire 31M from the bent portion 312 to the portion where the straight portion 313 is covered with the insulation 31I, i.e., a distance between the bent portion 312 and the insulation 31I along the extending direction. It is thereby possible to shorten the formation range of the covering material 5 in the leading-out direction of the one end 221*a* and the other end 221*b* of the armature winding 221, and it is possible to easily form the covering material 5.

Figures 9A, 9B, 9C, 9D:
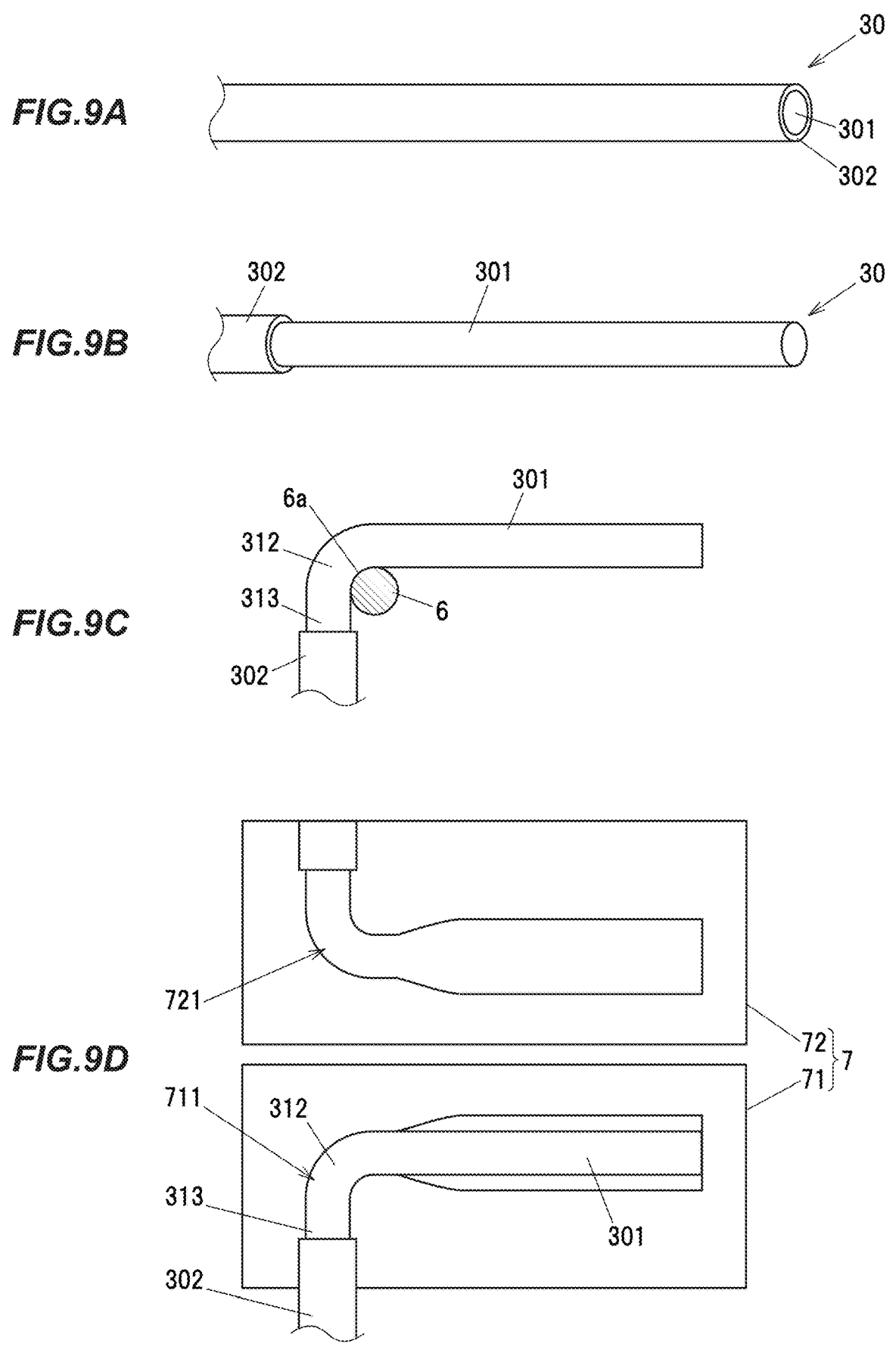

Next, an example of a method for manufacturing the first busbar 31 will be described with reference to FIGS. 9A to 9D. FIG. 9A is a perspective view showing one end of a material wire 30 which is the material of the first busbar 31. The material wire 30 is an insulated wire formed by covering a conductor wire 301 made of a conductive metal with an insulation 302, is cut to match the length of the finished first busbar 31, and is linearly shaped.

The first busbar 31 is manufactured by a manufacturing method that includes a first step of removing a predetermined length of the insulation 302 at an end of the material wire 30, a second step of forming the bent portion 312 by bending the conductor wire 301 of a portion where the insulation 302 has been removed, and a third step of forming the connecting portion 311 by processing a portion of the conductor wire 301 on a tip side relative to the bent portion 312 into a flat plate shape.

FIG. 9B is a perspective view showing the material wire 30 after the first step is performed. The length of the insulation 302 to be removed in the first step is the length of the connecting portion 311, the gradually changing portion 314, the extension portion 315 and the bent portion 312 in the extending direction of the conductor wire 31M of the first busbar 31, plus the above-mentioned distance $D_2$.

FIG. 9C is an explanatory diagram illustrating the second step. In the second step, using a columnar tool 6 with a radius corresponding to the radius of curvature of the inner part of the bend at the bent portion 312, the conductor wire 301 is bent and plastically deformed along an outer circumferential surface 6*a* of the tool 6, thereby forming the bent portion 312. Here, the distance $D_1$ between the connecting portion 311 and the bent portion 312 in the extending direction of the conductor wire 31M of the first busbar 31 (see FIG. 6) is, e.g., not more than three times the diameter of the conductor wire 301 of the material wire 30, more desirably, not more than two times. In the example shown in FIG. 9C, this magnification is two times. The diameter of the conductor wire 301 is the same as the diameter of the conductor wire 31M at the straight portion 313 of the first busbar 31.

FIG. 9D is an explanatory diagram illustrating the third step. In the third step, the tip portion of the conductor wire 301 is pressed and crushed to form the connecting portion 311. In the example shown in FIG. 9D, using a die 7 having a lower die 71 and an upper die 72, the conductor wire 301 is sandwiched and crushed by the lower die 71 and the upper die 72, thereby forming the connecting portion 311 and the gradually changing portion 314. The lower die 71 and the upper die 72 have holding grooves 711 and 721 to hold the bent portion 312 formed in the second step and a part of the straight portion 313.

Since the bent portion 312 is formed in the second step and the connecting portion 311 is then formed in the third step while holding the bent portion 312 between the lower die 71 and the upper die 72, the shape accuracy of the first busbar 31 can be enhanced. That is, in case that the connecting portion 311 is formed first and the conductor wire 301 is then bent to form the bent portion 312, the angle of the straight portion 313 relative to the connecting portion 311 is likely to deviate at the time of bending the conductor wire 301, and the connecting portion 311 may not directly face the one end 221*a* and the other end 221*b* of the armature winding 221 when the busbar unit 3 is combined with the rotating electrical machine 2. However, in the present embodiment, the relative angle between the straight portion 313 and the connecting portion 311 before and after the bent portion 312 can be adjusted with high accuracy.

The second busbar 32 and third busbar 33 are also manufactured by the same manufacturing method as the first busbar 31.

Effects of the Embodiment

According to the embodiment described above, the conductor wire 31M can be bent in the vicinity of the connecting portion 311 while maintaining the shape accuracy of the first busbar 31, and it is possible to suppress an increase in size of the first busbar 31. The same applies to the second busbar 32 and the third busbar 33.

Summary of the Embodiment

Technical ideas understood from the embodiment will be described below citing the reference signs, etc., used for the embodiment. However, each reference sign described below is not intended to limit the constituent elements in the claims to the members, etc., specifically described in the embodiment.

According to the first feature, a rotating electrical machine wiring component (the first busbar 31) configured to be connected to an armature winding 221 of a rotating electrical machine 2, the wiring component 31 for rotating electrical machine comprising: a conductor wire 31M comprising a conductive metal; and an insulation 31I covering a portion of the conductor wire 31M, wherein the conductor wire 31M comprises a flat plate-shaped connecting portion 311 located at one end and connected to the armature winding 221, and also comprises a bent portion 312 bent in the vicinity of the connecting portion 311 by a bending process, wherein the conductor wire 31M is not covered with the insulation 31I at the connecting portion 311 and the bent portion 312, and wherein a cross-sectional shape of the conductor wire 31M in a cross-section perpendicular to an extending direction of the conductor wire 31M is rectangular at the connecting portion 311 and circular at the bent portion 312.

According to the second feature, in the rotating electrical machine wiring component 31 as described by the first feature, the connecting portion 311 is rectangular in shape when viewed from a side where the armature winding 221 to be connected thereto is located, and the conductor wire 31M is bent at the bent portion 312 to turn in a lateral direction of the connecting portion 311 relative to the connecting portion 311.

According to the third feature, in the rotating electrical machine wiring component 31 as described by the second feature, a plurality of ends 221a, 221b of the armature winding 221 are connected to the connecting portion 311, and a distance $D_1$ between the connecting portion 311 and the bent portion 312 is shorter than a length $L_1$ of the connecting portion 311 in a longitudinal direction.

According to the fourth feature, in the rotating electrical machine wiring component 31 as described by any one of the first to third features, the insulation 31I covers an outer circumferential surface of the conductor wire 31M at a position farther from the connecting portion 311 than from the bent portion 312 in the extending direction, and a distance $D_2$ between the bent portion 312 and the insulation 31I along the extending direction is shorter than the distance $D_1$ between the connecting portion 311 and the bent portion 312.

According to the fifth feature, a method for manufacturing a rotating electrical machine wiring component 31 configured to be connected to an armature winding 221 of a rotating electrical machine 2, the method comprising: using, as a material, an insulated wire (the material wire 30) obtained by covering a conductor wire 301 comprising a conductive metal with an insulation 302; a first step of removing a predetermined length of the insulation 302 at an end of the material; a second step of forming a bent portion 312 by bending the conductor wire 301 of a portion where the insulation 302 has been removed; and a third step of forming a connecting portion 311 to be connected to the armature winding 221, by processing a portion of the conductor wire 301 on a tip side relative to the bent portion 312 into a flat plate shape.

Although the embodiment of the invention has been described, the invention according to claims is not to be limited to the embodiment described above. Further, please note that not all combinations of the features described in the embodiment are necessary to solve the problem of the invention.

The invention claimed is:

1. A rotating electrical machine wiring component configured to be connected to an armature winding of a rotating electrical machine, the rotating electrical machine wiring component comprising:
   a conductor wire comprising a conductive metal; and
   an insulation covering a portion of the conductor wire,
   wherein the conductor wire comprises a flat plate-shaped connecting portion located at one end and connected to the armature winding, and a bent portion bent by a bending process in a vicinity of the connecting portion,
   wherein the conductor wire is not covered with the insulation at the connecting portion and the bent portion, and
   wherein a cross-sectional shape of the conductor wire in a cross-section perpendicular to an extending direction of the conductor wire is rectangular at the connecting portion and circular at the bent portion.

2. The rotating electrical machine wiring component, according to claim 1, wherein the connecting portion is rectangular in shape when viewed from a side where the armature winding to be connected thereto is located, and wherein the conductor wire is bent at the bent portion to turn in a lateral direction of the connecting portion relative to the connecting portion.

3. The rotating electrical machine wiring component, according to claim 2, wherein a plurality of ends of the armature winding are connected to the connecting portion, and wherein a distance between the connecting portion and the bent portion is shorter than a length of the connecting portion in a longitudinal direction.

4. The rotating electrical machine wiring component, according to claim 1, wherein the insulation covers an outer circumferential surface of the conductor wire at a position farther from the connecting portion than from the bent portion in the extending direction, and wherein a distance between the bent portion and the insulation along the extending direction is shorter than the distance between the connecting portion and the bent portion.

5. A method for manufacturing a rotating electrical machine wiring component configured to be connected to an armature winding of a rotating electrical machine, the method comprising:
   using, as a material, an insulated wire obtained by covering a conductor wire comprising a conductive metal with an insulation;
   removing a predetermined length of the insulation at an end of the material;
   forming a bent portion by bending the conductor wire of a portion where the insulation has been removed; and forming a connecting portion to be connected to the armature winding, by processing a portion of the conductor wire on a tip side relative to the bent portion into a flat plate shape.

\* \* \* \* \*